United States Patent
Thompson et al.

(10) Patent No.: US 7,569,299 B2
(45) Date of Patent: Aug. 4, 2009

(54) MULTI-COMPONENT FUEL CELL GASKET FOR LOW TEMPERATURE SEALING AND MINIMAL MEMBRANE CONTAMINATION

(75) Inventors: Eric L. Thompson, Honeoye, NY (US); Gerald W. Fly, Geneseo, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 308 days.

(21) Appl. No.: 11/459,660

(22) Filed: Jul. 25, 2006

(65) Prior Publication Data

US 2008/0026280 A1    Jan. 31, 2008

(51) Int. Cl.
*H01M 2/08*    (2006.01)

(52) U.S. Cl. .......................................... 429/35

(58) Field of Classification Search .................. 429/33, 429/44, 35
See application file for complete search history.

(56) References Cited

U.S. PATENT DOCUMENTS

| | | | |
|---|---|---|---|
| 3,985,578 A | 10/1976 | Witherspoon et al. | |
| 5,272,017 A | 12/1993 | Swathirajan et al. | |
| 5,624,769 A | 4/1997 | Li et al. | |
| 5,776,624 A | 7/1998 | Neutzler | |
| 6,103,409 A | 8/2000 | DiPierno Bosco et al. | |
| 6,277,513 B1 | 8/2001 | Swathirajan et al. | |
| 6,350,539 B1 | 2/2002 | Wood, III et al. | |
| 6,372,376 B1 | 4/2002 | Fronk et al. | |
| 6,376,111 B1 | 4/2002 | Mathias et al. | |
| 6,521,381 B1 | 2/2003 | Vyas et al. | |
| 6,524,736 B1 | 2/2003 | Sompalli et al. | |
| 6,528,191 B1 | 3/2003 | Senner | |
| 6,566,004 B1 | 5/2003 | Fly et al. | |
| 6,630,260 B2 | 10/2003 | Forte et al. | |
| 6,663,994 B1 | 12/2003 | Fly et al. | |
| 6,692,860 B2 * | 2/2004 | Inoue et al. | 429/35 |
| 6,740,433 B2 | 5/2004 | Senner | |
| 6,777,120 B2 | 8/2004 | Nelson | |
| 6,793,544 B2 | 9/2004 | Brady et al. | |
| 6,794,068 B2 | 9/2004 | Rapaport | |
| 6,824,909 B2 | 11/2004 | Mathias et al. | |
| 7,344,794 B2 * | 3/2008 | Tanaka et al. | 429/34 |
| 2004/0229087 A1 | 11/2004 | Senner et al. | |
| 2005/0026012 A1 | 2/2005 | O'Hara | |
| 2005/0026018 A1 | 2/2005 | O'Hara et al. | |
| 2005/0026523 A1 | 2/2005 | O'Hara et al. | |

\* cited by examiner

*Primary Examiner*—Patrick Ryan
*Assistant Examiner*—Thomas H. Parsons
(74) *Attorney, Agent, or Firm*—John A. Miller; Miller IP Group, PLC

(57) ABSTRACT

A gasket for a fuel cell, wherein the gasket includes the use of two or more different materials as the gasket. For example, ethylene propylene diene monomer (EPDM) and/or the like, or another more chemically inert gasket material, is located inside or on an inboard position and is the wetted material that is exposed to the fuel cell operating environment. Silicone and/or the like, or another potentially contaminating material with better cold temperature sealability, is located outside or on an outboard position and does not come in contact with the fuel cell internal environment. One method of constructing such a gasket would be two include two parallel bead traces of the gasket materials on a polyimide (e.g., KAPTON®) carrier, or the like.

12 Claims, 2 Drawing Sheets

MULTI-COMPONENT FUEL CELL GASKET FOR LOW TEMPERATURE SEALING AND MINIMAL MEMBRANE CONTAMINATION

FIELD OF THE INVENTION

The present invention relates generally to fuel cells, and more particularly to fuel cell gaskets that have enhanced low temperature sealing and membrane contamination resistance characteristics.

BACKGROUND OF THE INVENTION

Fuel cells have been used as a power source in many applications. For example, fuel cells have been proposed for use in electrical vehicular power plants to replace internal combustion engines. In proton exchange membrane (PEM)-type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements, sometimes referred to as the gas diffusion media components, that: (1) serve as current collectors for the anode and cathode; (2) contain appropriate openings therein for distributing the fuel cell's gaseous reactants over the surfaces of the respective anode and cathode catalysts; (3) remove product water vapor or liquid water from electrode to flow field channels; (4) are thermally conductive for heat rejection; and (5) have mechanical strength. The term fuel cell is typically used to refer to either a single cell or a plurality of cells (e.g., a stack) depending on the context. A plurality of individual cells are commonly bundled together to form a fuel cell stack and are commonly arranged in series. Each cell within the stack comprises the MEA described earlier, and each such MEA provides its increment of voltage.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

Examples of technology related to PEM and other related types of fuel cell systems can be found with reference to commonly-assigned U.S. Pat. Nos. 3,985,578 to Witherspoon et al.; 5,272,017 to Swathirajan et al.; 5,624,769 to Li et al.; 5,776,624 to Neutzler; 6,103,409 to DiPierno Bosco et al.; 6,277,513 to Swathirajan et al.; 6,350,539 to Woods, III et al.; 6,372,376 to Fronk et al.; 6,376,111 to Mathias et al.; 6,521,381 to Vyas et al.; 6,524,736 to Sompalli et al.; 6,528,191 to Senner; 6,566,004 to Fly et al.; 6,630,260 to Forte et al.; 6,663,994 to Fly et al.; 6,740,433 to Senner; 6,777,120 to Nelson et al.; 6,793,544 to Brady et al.; 6,794,068 to Rapaport et al.; 6,811,918 to Blunk et al.; 6,824,909 to Mathias et al.; U.S. Patent Application Publication Nos. 2004/0229087 to Senner et al.; 2005/0026012 to O'Hara; 2005/0026018 to O'Hara et al.; and 2005/0026523 to O'Hara et al., the entire specifications of all of which are expressly incorporated herein by reference.

For automotive applications, PEM fuel cells must be operable down to −40° C. Silicone, or fluorosilicone, gaskets can provide adequate sealing for fuel cells down to this temperature, but are believed to leach out undesirable contaminants and fillers in the fuel cell internal operating environment, e.g., through the internal wetted surface. These contaminants are believed to poison the catalysts and proton-conduction sites of the membranes, and degrade the gasket. Other gasket materials, such as EPDM, have been resistant to the harsh internal environment of the PEM fuel cell, and do not contaminate the membrane or degrade the sealing qualities. One significant drawback, however, is that EPDM, with its higher glass transition temperature, has been shown to not seal as well, especially at relatively cold temperatures.

Accordingly, there exists a need for a new and improved fuel cell gasket that has enhanced low temperature sealing and membrane contamination resistance characteristics.

SUMMARY OF THE INVENTION

In accordance a first embodiment of the present invention, a fuel cell is provided, comprising: (1) first and second spaced and opposed bipolar plate members; (2) first and second spaced and opposed diffusion medium members disposed between the first and second bipolar plate members; (3) a membrane electrode assembly member disposed between the first and second diffusion medium members; (4) a first seal member in an inboard position relative to the first and second bipolar plate members; and (5) a second seal member adjacent to the first seal member, wherein the second seal member is in an outboard position relative to the first and second bipolar plate members.

The fuel cell also includes a carrier member, wherein the carrier member is operable to support the first and second seal members. In accordance with one aspect of the present invention, the carrier member is comprised of a polyimide material.

The first seal member is comprised of a substantially chemically inert material. In accordance with one aspect of the present invention, the first seal member is comprised of a material selected from the group consisting of ethylene propylene diene monomer, rubber, fluoroelastomers, and combinations thereof.

The second seal member is operable to provide a sealing function equivalent to a leak rate no greater than 0.01 standard cubic centimeters per minute per centimeter of linear seal length. In accordance with one aspect of the present invention, the second seal member is comprised of a silicone material. In accordance with another aspect of the present invention, the silicone material is a fluorosilicone.

In accordance a first alternative embodiment of the present invention, a fuel cell is provided, comprising: (1) first and second spaced and opposed bipolar plate members; (2) first and second spaced and opposed diffusion medium members disposed between the first and second bipolar plate members; (3) a membrane electrode assembly member disposed between the first and second diffusion medium members; (4) a first seal member in an inboard position relative to the first and second bipolar plate members, wherein the first seal member is comprised of a material selected from the group consisting of ethylene propylene diene monomer, rubber, fluoroelastomers, and combinations thereof; and (5) a second seal member adjacent to the first seal member, wherein the second seal member is in an outboard position relative to the first and second bipolar plate members, wherein the second seal member is comprised of a silicone material.

In accordance a second alternative embodiment of the present invention, a fuel cell is provided, comprising: (1) first and second spaced and opposed bipolar plate members; (2) first and second spaced and opposed diffusion medium members disposed between the first and second bipolar plate members; (3) a membrane electrode assembly member disposed between the first and second diffusion medium members; (4) a first seal member in an inboard position relative to the first and second bipolar plate members, wherein the first seal member is substantially chemically inert; and (5) a second seal member adjacent to the first seal member, wherein the second seal member is in an outboard position relative to the first and second bipolar plate members, wherein the second seal member is operable to provide a sealing function equivalent to a leak rate no greater than 0.01 standard cubic centimeters per minute per centimeter of linear seal length.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The following description of the preferred embodiment(s) is merely exemplary in nature and is in no way intended to limit the invention, its application, or uses.

The present invention proposes the use of two or more materials as a gasket for use in conjunction with fuel cells.

In accordance with one aspect of the present invention, ethylene propylene diene monomer (EPDM) and/or the like, or another more chemically inert gasket material, is located in an inboard position and is the wetted material that is exposed to the fuel cell operating environment.

In accordance with another aspect of the present invention, silicone and/or the like, or another contaminating material with better cold-sealability is located in an outside or outboard position and does not come in contact with the fuel cell internal environment.

Figure 1:
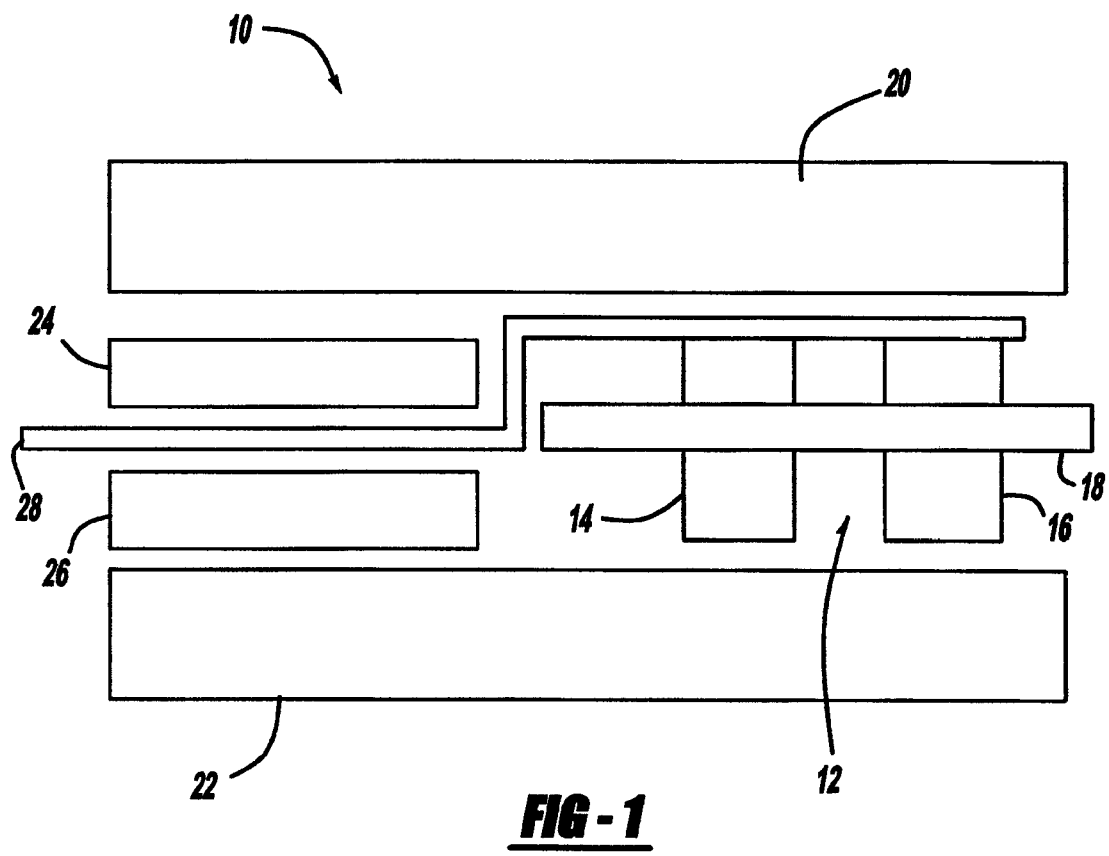
FIG. 1 is a schematic view of a fuel cell having a gasket in accordance with the general teachings of the present invention.

Referring to FIG. 1, there is shown a schematic view of a fuel cell 10 having a gasket 12 in accordance with the general teachings of the present invention. One method of constructing the gasket 12 would be to include two parallel bead traces 14, 16, respectively, of the materials discussed above, on a polyimide (e.g., KAPTON®) carrier 18.

By way of a non-limiting example, inboard bead trace 14 can be comprised of ethylene propylene diene monomer (EPDM) and/or the like, or another more chemically inert gasket material, such as but not limited to rubber and/or rubber-like materials.

By way of another non-limiting example, inboard bead trace 14 can be comprised of fluoroelastomers (e.g., VITON®) and/or the like, or another elastomeric polymer that is chemically inert to the fuel cell.

By way of still another non-limiting example, outboard bead trace 16 can be comprised of silicone and/or the like, or another contaminating material with better cold temperature sealability.

By way of still yet another non-limiting example, outboard bead trace 16 can be comprised of fluorosilicones and/or the like, or another contaminating material with better cold temperature sealability.

By "cold temperature sealability," as that phrase is used herein, it is meant that a leak rate, expressed in terms of standard cubic centimeters per minute (sccm)/cm, is no greater than 0.01 standard cubic centimeters per minute per centimeter of linear gasket (i.e., seal) length.

Other primary components of the fuel cell include, without limitation, first and second spaced and opposed bipolar plate members 20, 22, respectively, two spaced and opposed diffusion medium members 24, 26, respectively, adjacent to the bipolar plate members 20, 22, respectively, and a membrane electrode assembly 28, a portion of which is disposed between the diffusion medium members 24, 26, respectively.

Figure 2:
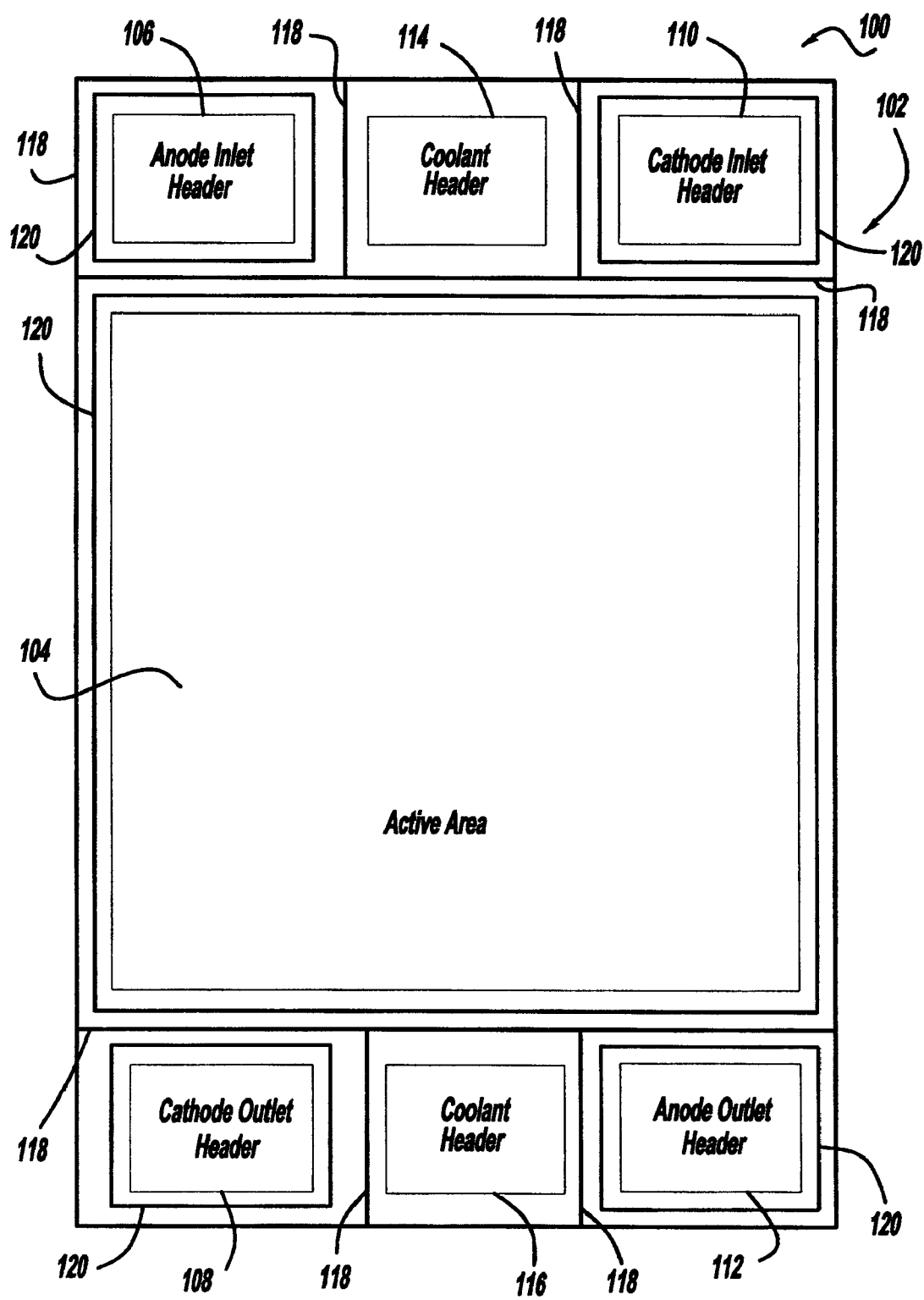
FIG. 2 is a schematic view of an alternative fuel cell having a gasket in accordance with the general teachings of the present invention.

Referring to FIG. 2, there is shown a schematic view of an alternative fuel cell 100 having a gasket 102 in accordance with the general teachings of the present invention. In this view, the fuel cell 100 includes a centralized active area 104, an anode inlet header 106, cathode outlet header 108, cathode inlet header 110, anode outlet header 112, and spaced and opposed coolant headers 114, 116, respectively. The gasket 102 includes silicone (or other suitable materials) gasket portions 118 and EPDM (or other suitable materials) gasket portions 120, that extend around the various components of the fuel cell 100. It should be appreciated that FIG. 2 is illustrative of one particular possible gasket arrangement in accordance with the present invention, and that other gasket arrangements are possible as well.

Some of the benefits of the present invention include, but are not limited to improved low temperature sealing of PEM fuel cells without the worry of contamination, e.g., from silicone contaminants, affecting durability.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell, comprising:
   first and second spaced and opposed bipolar plate members;
   first and second spaced and opposed diffusion medium members disposed between the first and second bipolar plate members;
   a membrane electrode assembly member disposed between the first and second diffusion medium members;
   a first seal member in an inboard position relative to the first and second bipolar plate members, wherein the first seal member is comprised of a material selected from the group consisting of ethylene propylene diene monomer, rubber, fluoroelastomers, and combinations thereof; and
   a second seal member adjacent to the first seal member, wherein the second seal member is in an outboard position relative to the first seal member and the first and second bipolar plate members, wherein the second seal member is comprised of a silicone material, and wherein the first and second seal members are not physically attached to each other as parts of the same seal.

2. The invention according to claim 1, further comprising a carrier member, wherein the carrier member is operable to support the first and second seal members.

3. The invention according to claim 2, wherein the carrier member is comprised of a polyimide material.

4. The invention according to claim 1, wherein the first seal member is comprised of a substantially chemically inert material.

5. The invention according to claim 1, wherein the second seal member is operable to provide a sealing function equivalent to a leak rate no greater than 0.01 standard cubic centimeters per minute per centimeter of linear seal length.

6. The invention according to claim 1, wherein the silicone material is a fluorosilicone.

7. A fuel cell, comprising:
   first and second spaced and opposed bipolar plate members;
   first and second spaced and opposed diffusion medium members disposed between the first and second bipolar plate members;
   a membrane electrode assembly member disposed between the first and second diffusion medium members;
   a first seal member in an inboard position relative to the first and second bipolar plate members, wherein the first seal member is substantially chemically inert; and
   a second seal member adjacent to the first seal member, wherein the second seal member is in an outboard position relative to the first seal member and the first and second bipolar plate members, wherein the second seal member is operable to provide a sealing function equivalent to a leak rate no greater than 0.01 standard cubic centimeters per minute per centimeter of linear seal length, and wherein the first and second seal members are not physically attached to each other as parts of the same seal and are composed of different sealing materials.

8. The invention according to claim 7, further comprising a carrier member, wherein the carrier member is operable to support the first and second seal members.

9. The invention according to claim 8, wherein the carrier member is comprised of a polyimide material.

10. The invention according to claim 7, wherein the first seal member is comprised of a material selected from the group consisting of ethylene propylene diene monomer, rubber, fluoroelastomers, and combinations thereof.

11. The invention according to claim 7, wherein the second seal member is comprised of a silicone material.

12. The invention according to claim 11, wherein the silicone material is a fluorosilicone.

* * * * *